Aug. 25, 1931.  J. ARICO  1,820,766
PNEUMATIC TIRE
Filed Jan. 10, 1928  2 Sheets-Sheet 1

INVENTOR.
Joseph Arico,
BY Geo. F. Kimmel
ATTORNEY.

Aug. 25, 1931.    J. ARICO    1,820,766
PNEUMATIC TIRE
Filed Jan. 10, 1928    2 Sheets-Sheet 2
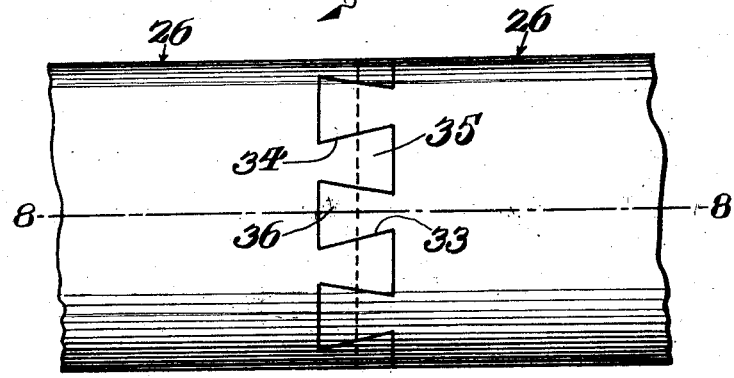
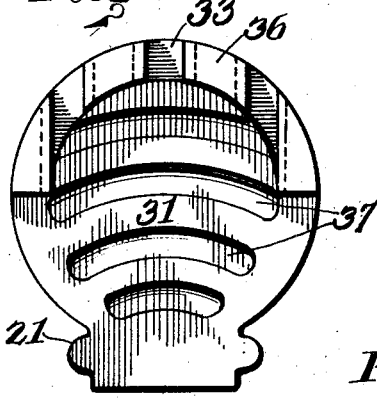
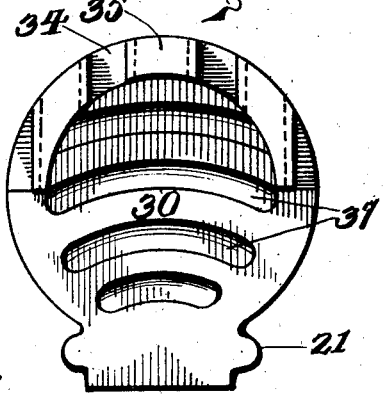
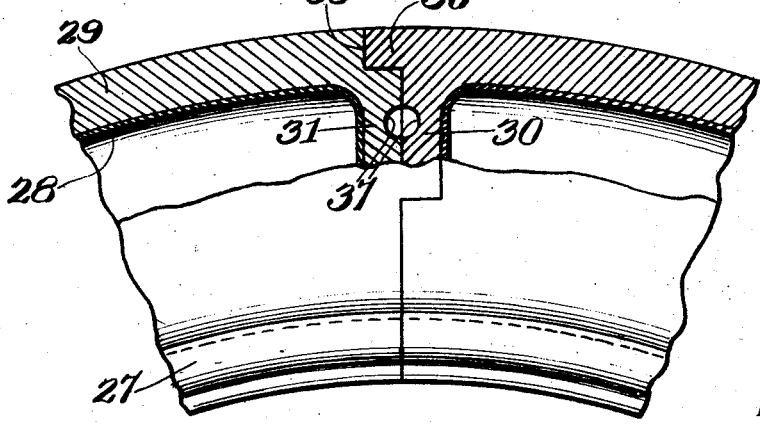
INVENTOR.
Joseph Arico,
BY
Geo. P. Kimmel
ATTORNEY.

Patented Aug. 25, 1931

1,820,766

UNITED STATES PATENT OFFICE

JOSEPH ARICO, OF NEW YORK, N. Y., ASSIGNOR OF ONE-FOURTH TO SECTIONAL TIRE CORPORATION, OF NEW YORK, N. Y., A CORPORATION OF NEW YORK, AND ONE-FOURTH TO LOUIS MOROSINI, OF NEW YORK, N. Y.

PNEUMATIC TIRE

Application filed January 10, 1928. Serial No. 245,671.

This invention relates to a pneumatic tire of the multicellular type, and has for its object to provide, in a manner as hereinafter set forth, a tire of such class formed of a plurality of cushioned sections each capable of being independently attached and detached from the felloe of a wheel whereby on the occasion of a blowout or puncture it does not necessitate the substitution of an entire new tire or the jacking up or removing of the entire tire for repair purposes, as all that is necessary to do is to remove that section wherein the puncture or blowout exists, therefore by the foregoing arrangement the cost of maintainence is materially reduced.

A further object of the invention is to provide, in a manner as hereinafter set forth, a pneumatic tire of the multi-cellular type constructed and arranged whereby in case of a puncture or blowout only one of the cells will be deflated permitting of the other inflated portion of the tire being employed for sustaining or traction purposes under such conditions reducing accidents to a minimum.

A further object of the invention is to provide, in a manner as hereinafter set forth, a sectional pneumatic tire of the multi-cellular type having the sections thereof detachable and of like construction, and whereby when a section becomes damaged it can be readily removed and repaired or a new one substituted, and further a sectional tire in accordance with this invention overcomes the necessity of carrying spare tires, as all that is necessary is to carry spare sections which can be conveniently stored within the vehicle body.

Further objects of the invention are to provide, in a manner as hereinafter set forth, a pneumatic tire of the multi-cellular type which is simple in its construction and arrangement, strong, durable, compact, thoroughly efficient in its use, conveniently attached and detached to and from the felloe of a wheel when occasion requires, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 5 is a fragmentary view in top plan of a pair of tire sections coupled together and of a modified form.

Figure 6 is a view looking towards one end of the modified form of tire section.

Figure 7 is a view similar to Figure 6 looking towards the other end of said modified form.

Figure 8 is a fragmentary view in sectional side elevation of a pair of tire sections coupled together of the modified form.

Figure 1:
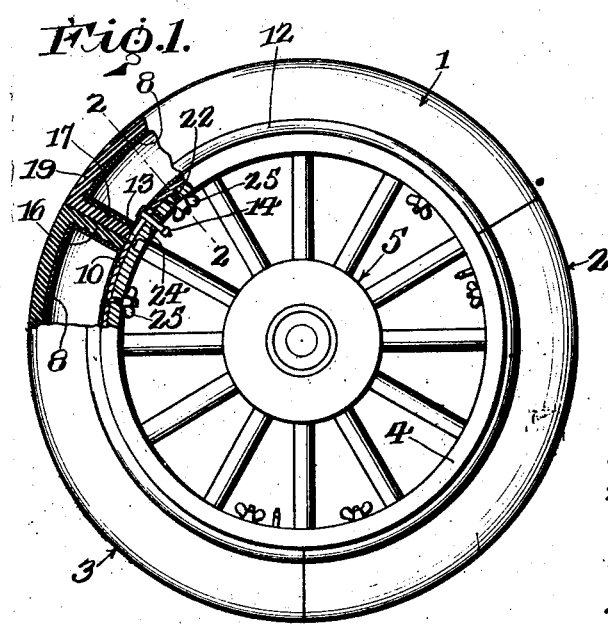
Figure 1 is a sectional elevation of a wheel showing the adaptation therewith of a pneumatic tire of the multi-cellular type in accordance with this invention, and with the tire broken away and partly in section.
Figure 2:
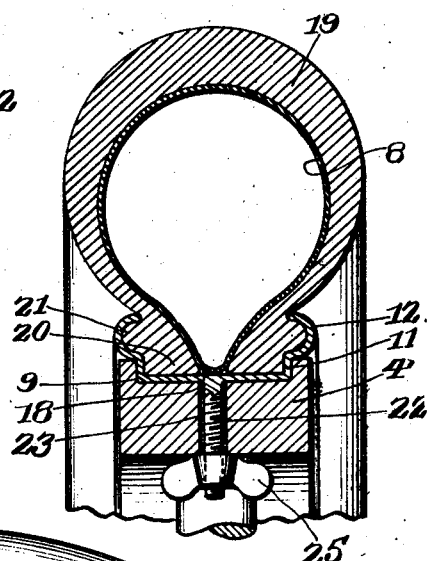
Figure 2 is a cross sectional view of a pneumatic tire in accordance with this invention.
Figure 3:
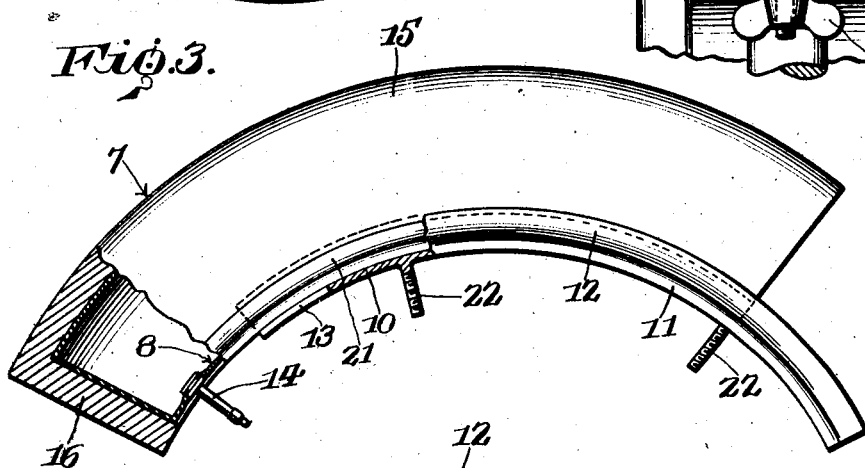
Figure 3 is a side elevation partly broken away and partly in section of one of the sections of the tire and further illustrating the rim member of the section shifted relative to the outer shoe.
Figure 4:
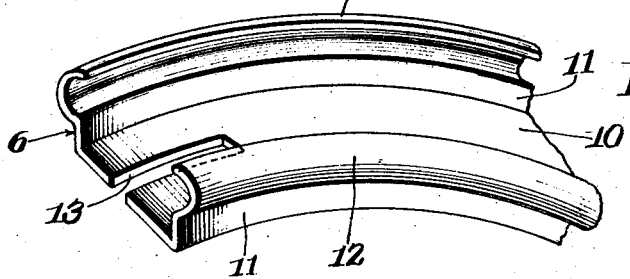
Figure 4 is a fragmentary view in perspective of a rim member of one of the tire sections.

A pneumatic tire of the multi-cellular type in accordance with this invention is formed of two or more sections, preferably three, of arcuate form and which when secured upon the felloe of a wheel provide an annulus. By way of example, the tire is illustrated as formed with three cushioned sections of like construction. The sections of the tire are indicated generally at 1, 2 and 3 and when secured upon the felloe 4 of the wheel 5 are arranged in abutting relation. The sections are independent of each other and one can be secured or detached from the felloe, without attaching or detaching another section or in other words the sections are independently removable upon the felloe 4 when occasion requires. The felloe 4 has its outer edge provided with a circumferentially extending groove 9 for a purpose to be presently referred to. The groove 9 is endless.

Each tire section comprises a rim member 6, an outer shoe 7 and a closed, flexible, air receiving casing 8. The casing 8 is inflatable and is arranged within the outer shoe 7.

The rim member 6 and outer shoe 7 are of arcuate contour and the former includes a shallow channel shaped body portion 10 having each of its sides 11 thereof formed with an offset flange 12 of semi-circular cross section. One end of the body portion 10 is formed at its longitudinal median with a slot 13, open at its outer end and providing a clearance for the filler valve 14 of the casing 8. The valve 14 is secured to the casing 8 in proximity to one end thereof.

The outer shoe 7 comprises a body portion 15 and a pair of end walls 16, 17. The body portion 15 includes an outer wall and a pair of side walls. The outer and side walls of the body portion are integral with the end walls 16, 17. The inner side of the body portion 15 is longitudinally slitted as at 18 to provide for the positioning of the casing 8 within said shoe 7. The body portion 15 includes an oval-shaped part 19 which merges into a rectangular part 20 formed at each side with a laterally projecting bead 21 of semi-circular cross section. The part 20 is adapted to be seated in the body portion 10 and the beads 21 are overlapped by the flanges 12 whereby the rim member 6 and shoe 7 are coupled together.

When the casing 8 is extended or inflated it conforms in contour to the inner shape of the shoe 7 and extends to the slit 18.

Formed integral with the rear face of the body portion 10 is a plurality of peripherally threaded tubular rods 22 of appropriate length and which extend through openings 23 formed in the felloe 4. Openings 24, only one of which is shown, are formed in the felloe 4 for the passage of the filler valves 14 of the sections of the tire. Mounted on the threaded rods 22 are wing nuts 25 which abut against the inner face of the felloe 4 for clamping the rim member 6 upon the felloe. The side walls of the groove 9 arrest lateral shifting of the rim member 6.

Figures 5 to 8 illustrate the providing of the tire sections with means at the ends thereof for closing the joint therebetween and to prevent the entrance of a tread chain or other object between the opposed ends of the sections. The modified form of tire section is indicated generally at 26 and includes a rim member 27, an inflatable, flexible, air receiving casing 28 and an outer shoe 29. The member 27 and casing 28 are constructed in the same manner as the member 6 and casing 8 respectively.

Each shoe 29 includes a pair of end walls, a pair of side walls and an outer wall. The end walls are indicated at 30, 31. The shoe 29 at one end is formed with an arcuate row of dovetailed grooves 33 and at its other end with an arcuate row of dovetailed grooves 34. The grooves 33 are alternately disposed with respect to the grooves 34. Each groove of each row opens at the outer periphery and at an end of the shoe. The outer grooves of the row of grooves 34 are not provided with outer side walls. The rows of grooves form dovetail sockets for a purpose to be presently referred to. The grooves of row 33 are arranged in one end of the outer wall of the shoe 29 and extend in the direction of the length of the latter. The grooves of row 34 are arranged in the other end of the outer wall and the outer portion of the end of each side wall of the shoe 29 and extend in the direction of the length of the latter.

Projecting outwardly from one end of the shoe 29 is an arcuate row of dovetailed tongues 35 formed as a continuation of the end wall 30 defining the grooves 34. Projecting outwardly from the other end of the shoe 29 is an arcuate row of dovetailed tongues 36 formed as a continuation of the end wall 31 defining the grooves 33. The tongues 35 are alternately disposed with respect to the tongues 36. The tongues 35 are flush with the outer periphery of the outer wall of the shoe 29. The tongues 36 are flush with the outer periphery of the outer wall and the outer portion of the outer periphery of the side walls of the shoe 29. The row of tongues 35 are integral with one end of the outer wall of shoe 29. The row of tongues 36 are integral with the other end of the outer wall and the outer portion of an end of each side wall of the shoe 29.

The tongues 35 of one shoe engage in the grooves 33 of an adjacent shoe. The tongues 36 of one shoe engage in the grooves 34 of an adjacent shoe. The tongues coact with the grooves for locking the shoe together with the end walls of one shoe abutting opposing end walls of adjacent shoes. The tongues when seated in the grooves completely bridge the joint between abutting end walls and close the outer end and outer portions of the sides of the joints between the shoes to prevent the entrance of foreign bodies between the opposed ends from the tread thereof. The shoes 29 are secured to the felloe 4. The tongues and grooves provide interengaging overlapping means arranged at the upper portions of the ends of the tire sections to provide for closing the joint between the sections at the top of the joint. The tongues and grooves extend in the direction of the length of the sections. The tongues of one section project from the ends thereof to engage in the grooves at the ends of an adjacent section. By this arrangement the joints between the abutting ends of the sections are closed or sealed at the tops thereof.

The outer faces of the end walls 30, 31 are formed with superposed, spaced, transversely extending, narrow cavities 37 of arcuate form to increase the resiliency of said walls. The cavities have their end walls spaced from the sides of the sections. The lengths of the cavities gradually increase from the lower cavity to the uppermost cavity.

Otherwise than that as stated the construction of the shoe 29 is the same as the shoe 7.

The outer faces of the end walls 30, 31 are formed with superposed spaced transversely extending segmental grooves 37 to increase the resiliency of said walls. Otherwise than that as stated the construction of the shoe 29 is the same as shoe 7.

The construction shown permits for conveniently detaching a tire section when desired from the felloe 4 for the purpose of substituting a new section or for repairing the damaged section and such section is independently removable with respect to the other sections of the tire, under such conditions it does not necessitate the removal of the entire tire for repair purposes if a section thereof becomes damaged, therefore it is thought the many advantages of a pneumatic tire of the multi-cellular type, in accordance with this invention can be readily understood, and although the preferred embodiment of the invention is as illustrated and described, yet it is to be understood that changes in the details of construction can be had which fall within the scope of the invention as claimed.

What I claim is:

1. A pneumatic tire comprising an annulus formed of a series of independently removable, inflatable, abutting sections, each of said sections including an outer shoe formed of an imperforate outer wall, a pair of imperforate end walls and a pair of imperforate side walls, each end terminal of each section being formed with an arcuate row of spaced, dove-tailed sockets, one row being formed in one end of the end wall and the outer portion of one end of each side wall of the section, the other row being formed in the other end of the end wall of the section, the sockets of one row opening at the ends and outer face of the end wall, the sockets of the outer row opening at its ends and outer faces of the end and side walls, each end terminal of each section being formed with an arcuate row of spaced, dove-tailed tongues projecting therefrom and extending in the direction of the length thereof, one row of tongues being integral with one end of and the outer portions of the side walls of the section, the tongues of the other row being integral with the other end of the end wall of the section, the tongues of one row having their outer faces flush with the outer face of the end wall of the section, the tongues of the other row having their outer faces flush with the outer face of the end and side walls of the section, said tongues seating in said sockets for locking the sections in endwise abutting relation and completely closing the outer ends and the outer portions of the sides of the joints between the sections.

2. A pneumatic tire comprising an annulus formed of a plurality of resilient independently removable, inflatable, endwise abutting sections, each end of each section being formed with a plurality of spaced transversely extending grooves to increase the resiliency thereof, the grooves in the ends of one section registering with the grooves in the opposing ends of adjacent sections, and said sections having the ends and sides thereof provided with means to arrest the entrance of foreign bodies to said grooves.

In testimony whereof, I affix my signature hereto.

JOSEPH ARICO.